(12) United States Patent
Limberger

(10) Patent No.: US 7,565,374 B2
(45) Date of Patent: Jul. 21, 2009

(54) DATABASE VISUALIZATION AND SEARCHING

(75) Inventor: Tobias Limberger, Seligenstadt (DE)

(73) Assignee: SAP AG, Walldorf (DE)

( * ) Notice: Subject to any disclaimer, the term of this patent is extended or adjusted under 35 U.S.C. 154(b) by 402 days.

(21) Appl. No.: 11/351,321

(22) Filed: Feb. 9, 2006

(65) Prior Publication Data
US 2006/0190442 A1    Aug. 24, 2006

(30) Foreign Application Priority Data
Feb. 10, 2005    (EP) .................................. 05002807

(51) Int. Cl.
*G06F 17/30* (2006.01)
(52) U.S. Cl. .................................. 707/102
(58) Field of Classification Search ............... 345/419, 345/440, 589, 593, 645, 650, 676; 707/6, 707/10, 102, 104.1, 3, 4, 5; 715/201, 205, 715/235, 272, 700, 716, 738, 763
See application file for complete search history.

(56) References Cited

U.S. PATENT DOCUMENTS

| | | | |
|---|---|---|---|
| 6,154,213 A | | 11/2000 | Rennison et al. |
| 6,392,667 B1 * | | 5/2002 | McKinnon et al. ........... 715/738 |
| 6,556,225 B1 | | 4/2003 | MacPhail |
| 6,772,139 B1 * | | 8/2004 | Smith, III ....................... 707/3 |
| 6,868,525 B1 * | | 3/2005 | Szabo .......................... 715/738 |
| 7,265,755 B2 * | | 9/2007 | Peterson ....................... 345/440 |
| 2003/0004936 A1 | | 1/2003 | Grune et al. |
| 2003/0144868 A1 * | | 7/2003 | MacIntyre et al. ............. 705/1 |
| 2004/0030741 A1 | | 2/2004 | Wolton et al. |

FOREIGN PATENT DOCUMENTS

| | | |
|---|---|---|
| GB | 2354920 | 4/2001 |
| WO | WO 01/37120 | 5/2001 |

OTHER PUBLICATIONS

"Welcome in RInvoice Help Version 2", http://www.rinvoice.com/download.htm. 34 pages, Mar. 1, 2001.
European Search Report received in EP 05002807.5, 3 pages, May 19, 2005.

* cited by examiner

*Primary Examiner*—Diane Mizrahi
(74) *Attorney, Agent, or Firm*—Brake Hughes Bellermann LLP

(57) ABSTRACT

In providing visualization of entries of a database for browsing meta data types may be provided, and meta data of each type may be associated with each database entry. The meta data types may describe different properties of the respective database entries. Three meta data types may be selected and mapped to a different one of three axes spanning a three dimensional space. Database entries may be displayed in the three dimensional space at coordinates given by the respective meta data of the three selected meta data types, thereby grouping related database entries generally in proximity to each other and unrelated database entries generally spaced apart.

16 Claims, 3 Drawing Sheets

ND SEARCHING

CROSS-REFERENCE TO RELATED APPLICATION

This application claims priority under 35 U.S.C. §119 to European Patent Application EP05 002 807.5, filed Feb. 10, 2005, titled "METHOD FOR VISUALIZING ENTRIES OF A DATABASE FOR BROWSING, METHOD FOR INTUITIVELY SEARCHING A DATABASE COMPUTER SYSTEM AND COMPUTER PROGRAM PRODUCT," which is incorporated herein by reference in its entirety.

TECHNICAL FIELD

This description relates to a method for visualizing entries of a database for browsing, and to a method for intuitively searching a database.

BACKGROUND

Retrieval of information from a database may require detailed knowledge of an associated user interface, and of the structure of the database to formulate a precise query. Known user interfaces and structures are generally sophisticated and require a high level of experience for efficient and successful access. Inexperienced users who access the database infrequently may not be able to adequately phrase a query. As a consequence, data that is actually available in the database may not be found by such users.

SUMMARY

Thus, techniques are described for visualizing entries of a database for browsing, and a method for intuitively searching a database. A computer system and a computer program product are also described as examples of how users may be allowed to search a database without exactly knowing where to search, or which specific entries are available.

According to one general aspect, A method for providing visualization of entries of a database for browsing includes providing meta data types and associating meta data of each type with each database entry, the meta data types describing different properties of the respective database entries. Three meta data types may be selected and mapped onto a different one of three axes spanning a three dimensional space. Database entries may be displayed in the three dimensional space at coordinates given by the respective meta data of the three selected meta data types, thereby grouping related database entries generally in proximity to each other and unrelated database entries generally spaced apart, the related database entries each forming at least one entity of database entries that is displayed as a graphical entity within the three dimensional space.

According to another general aspect, a computer program product includes a processor and a storage medium, the storage medium storing a computer code that upon execution on the processor causes the processor to select three types of meta data, each type describing a different property associated with a plurality of database entries, where the database entries are stored within a database in association with meta data of different types, display the database entries in a three dimensional space at coordinates corresponding to meta data of the three selected meta data types, thereby grouping related database entries generally in proximity to each other and unrelated database entries generally spaced apart, the related database entries each forming at least one entity of database entries that is displayed as a graphical entity within the three dimensional space; and receive a selection of a further database entry from within a selected graphical entity.

According to another general aspect, a system includes a browsable database with database entries and meta data types, wherein meta data of each type is associated with each database entry, the meta data types describing different properties of the respective database entries. The system includes selection logic operable to select three meta data types and further operable to map each of the selected meta data types onto a different one of three axes spanning a three dimensional space, and display logic operable to display database entries in the three dimensional space at coordinates given by the respective meta data of the three selected meta data types, thereby grouping related database entries generally in proximity to each other and unrelated database entries generally spaced apart, the related database entries each forming at least one entity of database entries that is displayed as a graphical entity within the three dimensional space.

The details of one or more implementations are set forth in the accompanying drawings and the description below. Other features will be apparent from the description and drawings, and from the claims.

DETAILED DESCRIPTION

Figure 1:
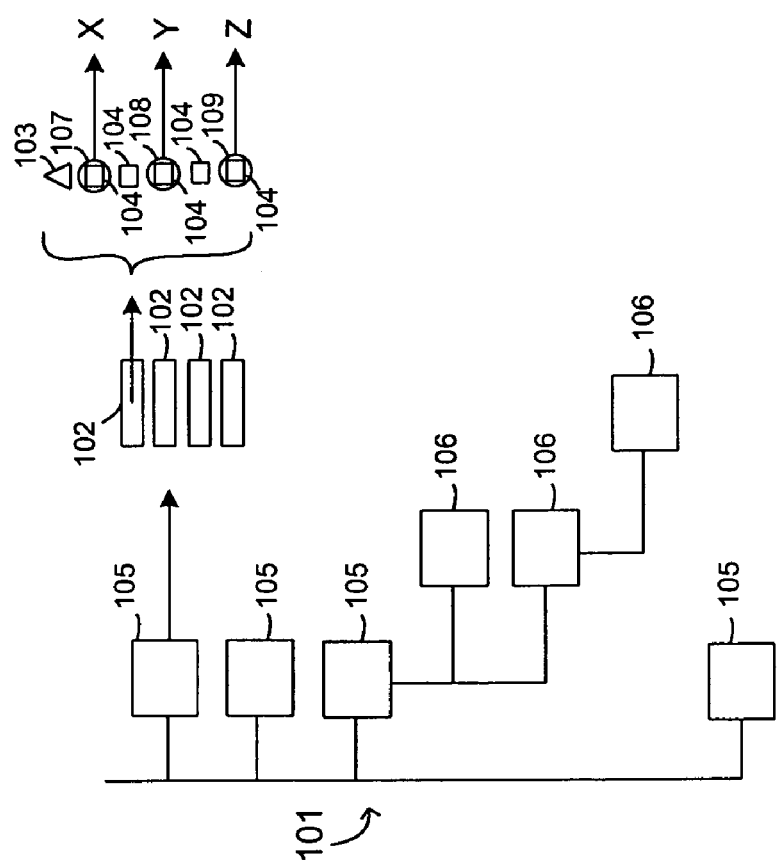
FIG. 1 is a block diagram of a database structure of the prior art and a relation of such a database structure to example implementations of the described visualization and searching techniques.

FIG. 1 is a block diagram of a database structure of the prior art and a relation of such a database structure to example implementations of the described visualization and searching techniques. A document database 101 comprises database entries 102 that each comprise a number of data 103 like one or more texts and/or pictures and meta data 104 describing the data 103 like creation date, file format and size of each text respectively picture, a topic, a level of confidentiality etc. The database entries 102 are here organized in folders 105 that may be hierarchically grouped, e.g. using subfolders 106 as shown in FIG. 1. The folders 105 and subfolders 106 may simply be, for example, folders in the directory "My Files" in the Microsoft Windows environment. The database entries 102 may however also be stored differently, e.g. in a database like the Oracle database with any kind of user defined structure or without any structure at all. Typical data access occurs via the hierarchical structure, if present, and/or by defining a search for keywords in the texts, and possibly time frames and topics etc. The search returns a list of database entries 102 that meet the search criteria.

Figure 3:
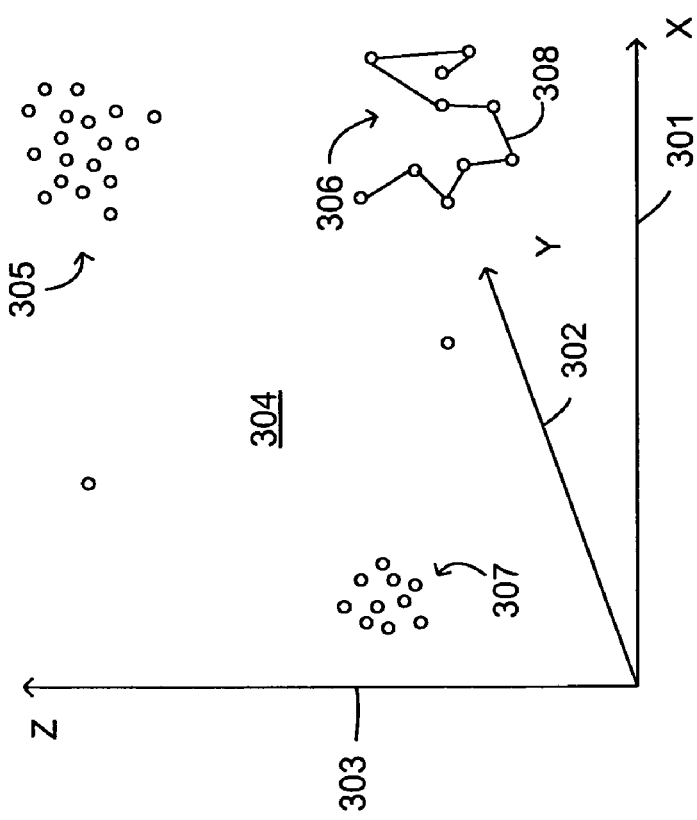
FIG. 3 is a graph illustrating a visualization of database entries according to the example of FIG. 2.
Figure 2:
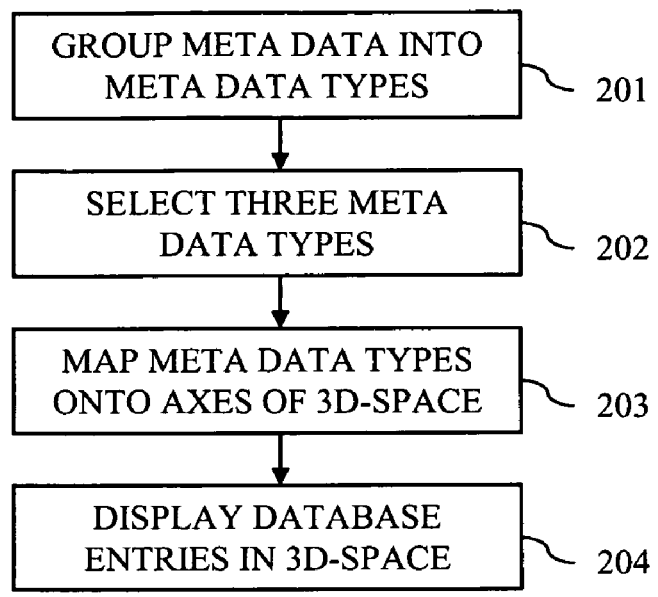
FIG. 2 is a flowchart illustrating example operations for visualization of database entries.

Referring to the example of FIG. 2, the meta data 104 associated with each database entry 102 may be grouped (201) into meta data types, each type describing a particular property of the corresponding database entry 102. A meta data type may be the file format, the file size, the date of creation etc. Three meta data types are selected (202), e.g. selection logic of a computer system may select the three meta data types 107, 108, 109 of FIG. 1. Each of the selected meta data types 107, 108, 109 is then mapped (203) onto a different one of three axes 301, 302, 303 spanning a three-dimensional space 304, as shown in the example of FIG. 3, e.g., by the selection logic. In the illustrated example of FIGS. 1 and 3, the selected meta data type 107 "file format" is mapped onto the x-axis 301, the selected meta data type 108 "confidentiality" is mapped onto the y-axis 302, and the selected meta data type 109 "date" is mapped onto the z-axis 303. Database entries 102 are then displayed 204 at coordinates given by the respective meta data of the selected meta data types 107, 108, 109. Database entries that are related in time, by file type, or by their level of confidentiality are grouped generally in proximity to each other, while unrelated database entries are generally spaced apart.

Figure 4:
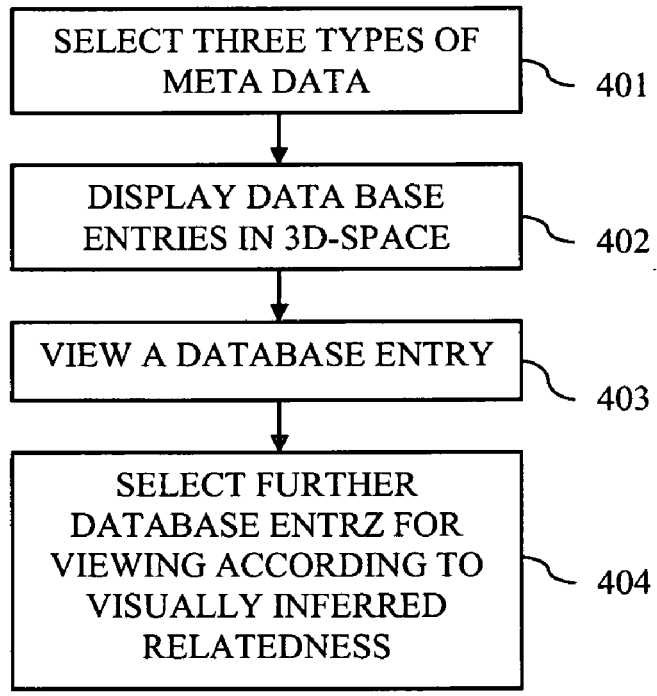
FIG. 4 is a flowchart illustrating example operations for intuitively searching a database.

The database entries in FIG. 3 thus form a scatter plot with related entries displayed close to each other and generally forming groups 305, 306, 307 as graphical entities. A user may therefore intuitively search the database as illustrated in the example of FIG. 4. First, the user or the database system selects (401) three types of meta data, each type describing a different property of the database entries. Display logic may then be used to display the database entries (402) in a three dimensional space at coordinates corresponding to meta data of the three selected meta data types, thereby grouping related database entries generally in proximity to each other and unrelated database entries generally spaced apart. The user may then view (403) a database entry and select (404) a further database entry for viewing depending on visually inferred relatedness.

When selecting (404) a further database entry for viewing, the user may consider distance and/or direction in the three dimensional space to one or more database entries that has already been viewed. For instance, if the user is within group 305 and finds that the entries in this group have no relationship to what he is looking for, he may continue his search directly in a different group 306, 307. If the database entries in the group 305 have some relationship with what he is looking for, the user may continue browsing in the group 305 by moving in the direction that has the best associations to what he is looking for, and he may choose long step sizes to quickly sample different areas of the group 305. Once the user finds database entries that are closely related to what he is looking for, he may use a smaller step size or browse through adjacent entries.

Displaying (204, 402) database entries in a three-dimensional space may comprise using graphical display elements like lines, different shapes, different color etc.

The database entries 102 may be displayed as dots or spheres. A fourth meta data type may be selected, e.g., by the selection logic, to specify the size, color, translucency etc. For example, database entries 102 having data 103 in form of a text may be displayed as blue spheres whereas database entries 102 having data 103 in form of a picture may be displayed as green spheres. Older database entries 102 or database entries 102 that are viewed seldom may be displayed as being more transparent or smaller than database entries 102 that are viewed frequently by users during browsing, or that are new. Form of displayed entries might also qualify, restricting available forms to those not suggesting directional information, such as, for example, spheres, cubes or octahedrons.

The displayed database entries may also be connected by a line 308 as illustrated in group 306 of FIG. 3. The line 308 may start at the oldest database entry 102 and proceed according to age to the latest database entry 102, thus forming a time-ordered interconnected string of database entries 102. Instead of the age of the database entry 102, other time information may be used for the line 308, e.g. the date of the data 103. The line 308 may branch if more than one element of a particular age is present.

The interconnection by lines 308 may also be used for database entries belonging to a particular entity. An entity is defined herein as something one can associate data with, e.g. a person that can be seen on a picture, a device that has been used for capturing a picture, a room in which pictures are captured, a folder in which data is stored, an event, etc. The group 306 may thus be the group of database entries 102 relating to a particular person.

The graphical elements like lines, shapes, color, size, transparency etc. may be used in any combination.

A mechanism, e.g., including monitor logic, may be provided that is operable to monitor which database entries are accessed during searches by one user or a group of users, and that suggests database entries for deletion that are accessed less than a predefined number of times during a time period, or that deletes such infrequently-selected database entries automatically. This ensures that only those database entries are kept in the database that either contain data that is searched for or that help the user during navigation through the database entries, e.g. by activating associations in the memory of the user.

Figure 5:
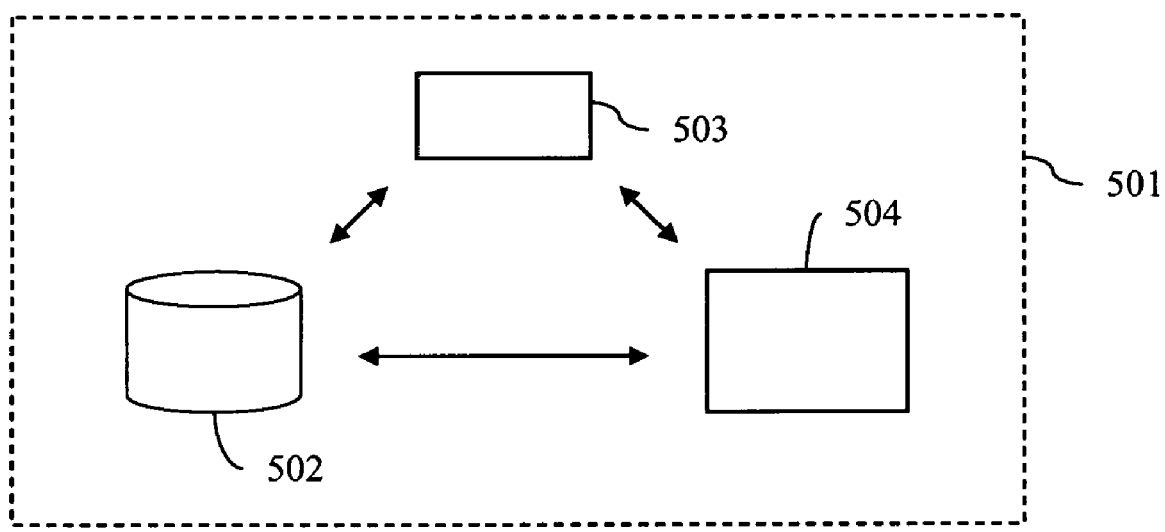
FIG. 5 illustrates a computer system that may be used to implement the features and functions of FIGS. 1-4.

The computer system 501 illustrated in FIG. 5 comprises a browsable database 502, e.g. a dedicated database server or a hard disk drive on a desktop computer. FIG. 5 also illustrates display 503 for displaying entries of the database in a three-dimensional space, e.g. a virtual reality human display interface or, if the three-dimensional space is to be mapped onto two dimensions, a monitor or LC-Display, and input device or software 504 for receiving user input, e.g. a keyboard or a speech recognition system. The database 502 and/or the display 503 may include, or be associated with, the described database entries, meta data, and meta data types. The database 502 and/or the display 503 also may include or be associated with the above-referenced selection logic operable to select meta data types and map the selected met data types onto the axes of FIG. 3, and/or display logic operable to display the groups of meta data in association with the axes (e.g., as shown in FIG. 3).

Although the foregoing has been a description of example embodiments, it will be apparent to those skilled in the art upon review of this disclosure that numerous variations and modifications may be made without departing from the spirit and intended scope of the invention. For example, any database or collection of data in a computer or computer system may benefit. The scope of the invention should, therefore, be determined not with reference to the above description but instead with reference to the appended claims along with their full scope of equivalents.

What is claimed is:

1. A method for providing visualization of entries of a database for browsing, comprising:

providing meta data types and associating meta data of each type with each database entry, the meta data types describing different properties of the respective database entries including one or more of time, place, topic and confidentiality;

selecting three meta data types and using a processor to map each of the selected meta data types onto a different one of three axes spanning a three dimensional space;

displaying database entries in the three dimensional space by a scatter plot at coordinates given by the respective meta data of the three selected meta data types;

grouping related database entries generally in proximity to each other and unrelated database entries generally spaced apart such that the database entries that are related in time, place, topic and confidentiality are grouped generally in proximity to each other, the related database entries each forming at least one entity of database entries that is displayed as a graphical entity within the three dimensional space;

selecting a fourth meta data type and using the processor to map the fourth meta data type as a graphical property to indicate a relative age of the database entries;

enabling browsing of the displayed database entries in the three dimensional space for selection of one or more of the database entries;

enabling viewing of a database entry in response to a selection of one of the displayed database entries; and enabling selection and viewing of one or more additional database entries based on a visually inferred relatedness of the database entries from the groupings of the database entries.

2. The method of claim 1, wherein the graphical entity displayed within the three dimensional space includes a scatter plot grouping.

3. The method of claim 1, wherein the database entries are graphically marked by one or more of a color, shape or interconnecting lines.

4. The method claim 1, wherein database entries adjacent in time are interconnected by lines to form a time-ordered interconnected string of database entries.

5. The method claim 1, wherein the fourth meta data type is selected and the database entries are graphically represented in the three dimensional space with the graphical property that varies as a function of the respective meta data of the fourth meta data type, the graphical property including one or more of a color, shape, size, or transparency.

6. The method of claim 1, comprising:
monitoring a browsing of the database entries; and
deleting database entries that are infrequently browsed.

7. A computer program product comprising a processor and a storage medium, the storage medium storing a computer code that upon execution on the processor causes the processor to:

select three types of meta data and use the processor to map each of the selected meta data types onto a different one of three axes spanning a three dimensional space, each type describing a different property associated with a plurality of database entries, where the database entries are stored within a database in association with meta data of different types including one or more of time, place, topic and confidentiality;

display the database entries in the three dimensional space by a scatter plot at coordinates corresponding to meta data of the three selected meta data types;

group related database entries generally in proximity to each other and unrelated database entries generally spaced apart such that the database entries that are related in time, place, topic and confidentiality are grouped generally in proximity to each other, the related database entries each forming at least one entity of database entries that is displayed as a graphical entity within the three dimensional space;

select a fourth meta data type and use the processor to map the fourth meta data type as a graphical property to indicate a relative age of the database entries;

enable browsing of the displayed database entries in the three dimensional space for selection of one or more of the database entries;

enable viewing of a database entry in response to a selection of one of the displayed database entries; and receive a selection of a further database entry from within a selected graphical entity based on a visually inferred relatedness of the database entries from the groupings of the database entries.

8. The computer program product of claim 7, wherein the execution of the computer code causes the processor to:
provide the related database entries within the graphical entity with based on one or more of a distance or direction within the three dimensional space; and
receive the selection of the further database entry based on the provided distance or direction.

9. The computer program product of claim 7, wherein database entries associated to the selected graphical entity are displayed as a time-ordered line-interconnected string.

10. The computer program product of claim 7, wherein the execution of the computer code causes the processor to:
provide the related database entries within the graphical entity; and
receive the selection of the further database entry based on a position of the database entry in a string of the graphical entity.

11. A system comprising:
a browsable database with database entries and meta data types, wherein meta data of each type is associated with each database entry, the meta data types describing different properties of the respective database entries including one or more of time, place, topic and confidentiality;

selection logic operable to select three meta data types and further operable to cause a processor to map each of the selected meta data types onto a different one of three axes spanning a three dimensional space; and display logic operable to display database entries in the three dimensional space by a scatter plot at coordinates given by the respective meta data of the three selected meta data types, thereby grouping related database entries generally in proximity to each other and unrelated database entries generally spaced apart such that the database entries that are related in time, place, topic and confidentiality are grouped generally in proximity to each other, the related database entries each forming at least one entity of database entries that is displayed as a graphical entity within the three dimensional space;

wherein the selection logic is further operable to select a fourth meta data type and further operable to cause the processor to map the fourth meta data type as a graphical property to indicate a relative age of the database entries, and wherein the display logic is further operable to:
enable browsing of the displayed database entries in the three dimensional space for selection of one or more of the database entries,
enable viewing of a database entry in response to a selection of one of the displayed database entries, and
enable selection and viewing of one or more additional database entries based on a visually inferred relatedness of the database entries from the groupings of the database entries.

12. The system of claim 11, wherein the graphical entity has associated database entries graphically marked as being included in the graphical entity.

13. The system of claim 12, wherein the database entries are graphically marked using one or more of a color, shape, and interconnecting lines.

14. The system of claim 11, wherein the display logic is operable to graphically represent at least one of the database entries in the three dimensional space with the graphical property that varies as a function of the at least one database entry's respective meta data of the fourth meta data type.

15. The system of claim 14, wherein the graphical property includes one or more of a color, shape, size and transparency.

16. The system of claim 11, comprising monitor logic operable to:
 monitor which database entries are browsed by a user;
 assess the frequency of browsing; and
 delete database entries that are browsed infrequently.

* * * * *